United States Patent [19]

Hugon

[11] 3,866,971
[45] Feb. 18, 1975

[54] MEANS FOR FASTENING A DRIVER PROTECTION SCREEN ON THE FRONT OF A MOTORCYCLE FRAME

[76] Inventor: Daniel Hugon, 38 Rue Pasteur, Moirans-En-Montagne, France

[22] Filed: May 17, 1973

[21] Appl. No.: 361,206

[30] Foreign Application Priority Data
Dec. 8, 1972  France ................................ 72.44436

[52] U.S. Cl. ............................................. 296/78.1
[51] Int. Cl. ............................................. B62j 17/00
[58] Field of Search .................... 296/78.1, 78 R

[56] References Cited
UNITED STATES PATENTS
3,154,342  10/1964  Mueller .............................. 296/78.1
FOREIGN PATENTS OR APPLICATIONS
544,836  6/1956  Italy ................................... 296/78.1
514,469  10/1952  Belgium ............................. 296/78.1

Primary Examiner—Allen N. Knowles
Attorney, Agent, or Firm—Dowell & Dowell

[57] ABSTRACT

The fastening means includes a pivot connection fixed to the screen and consisting of a pivot element fixed to the handlebars coaxially of their pivot shaft to support and orient the screen axially in the plane of symmetry of the motorcycle frame. At least one brace is provided fastening the screen to the frame and locking transversely in relation thereto in such position that the planes of symmetry of the screen and frame remain approximately in coincidence regardless of the angular position of the handle bars relative to the frame.

10 Claims, 6 Drawing Figures

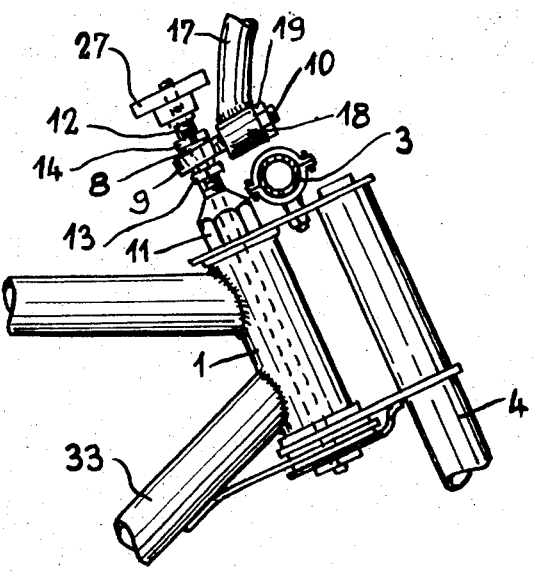
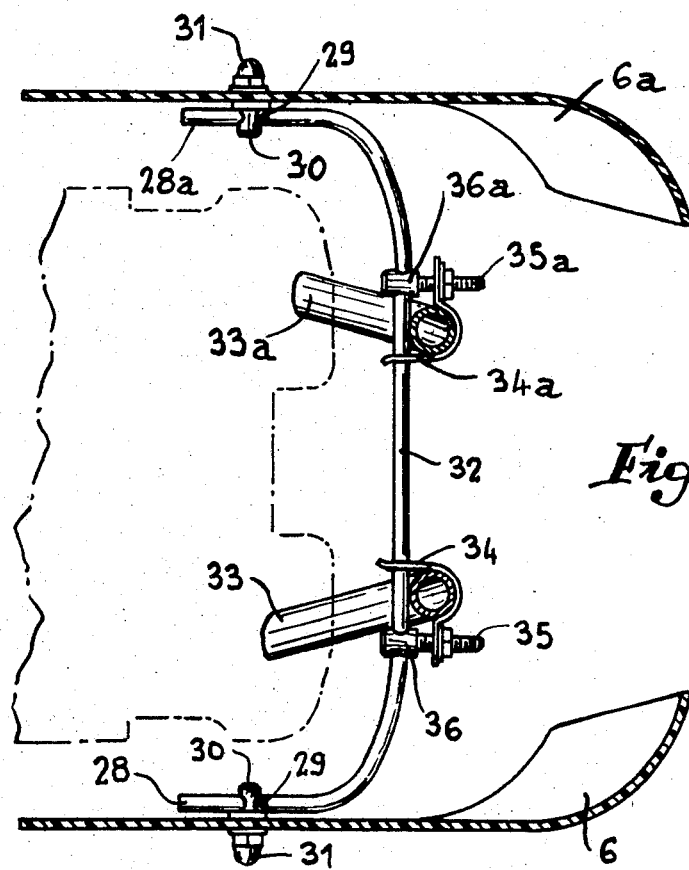

MEANS FOR FASTENING A DRIVER PROTECTION SCREEN ON THE FRONT OF A MOTORCYCLE FRAME

DESCRIPTION OF THE INVENTION

The invention relates to means for fastening a driver protection screen at the front of a motorcycle frame.

The object of the said invention is primarily to adapt these means to different motorcycles without modification, to simplify the arrangement and position adjustment on the frame, and to limit the disassembly and assembly of accessories fixed to the handlebars and the front wheel fork.

According to the invention means of this type consist of a pivoted connection fixed to the body and comprise a pivot intended to be fixed to the handlebars coaxially to their pivot axis to support and orient the screen axially in the plane of symmetry of the frame, and of at least one brace fixing the screen to the frame and locking it transversely to the said frame in a position in which the planes of symmetry of the said screen and frame are and remain at least approximately in coincidence regardless of the angular position of the handlebars relative to the frame.

The pivot connected cosists of at least one pivot arrangement whose pivot forms a ring provided with a peripheral ball bearing is locked on the normally tubular shaft with which the handlebars pivot on the frame.

In an advantageous embodiment of the invention the said ring is fixed on the said shaft by a bolt or rod extending through it coaxially.

In another embodiment the connection pivot is provided with a bolt carrying an axial thread capable of replacing on the threaded end of the handlebar pivot shaft the bolt normally retaining it axially in the frame sleeve acting as bearing therefor.

This threaded pivot consists advantageously of the assembly of two elements: The pivot ring provided with the peripheral roller or ball bearing, and of bolt with a threaded coaxial shank engaging the ring and locked by at least one nut.

At least in some cases it is advisable to construct the threaded shank in the form of a tube for the passage of the clamping bolt or a steering damper, acting as an end abutment for the knob of the said damper.

The coupling between the pivot connection and the screen consists advantageously of a tube comprising a substantially vertical portion whose end is fixed to the said connection, and a curved portion extending above the handlebars and continuing at a downward and forward inclination to a plate or bracket fixed to a transverse support plate near the top of the screen.

In a preferred embodiment in bearing of the connection pivot is provided with a threaded extension, and the lower end of the vertical portion of the bent tube carries a transverse ring in which the said threaded extension is fixed by a nut in different axial positions between which it can be moved forward or backward in the plane of symmetry of the said tube.

The brace connecting the screen to the frame for integral rotatin with the steering shaft consists advantageously of a U-shaped rod mounted transversely between the lateral deflectors arranged substantially parallel to the screen, each of the two parallel branches of the U extending along the internal face of one of the said deflectors and sliding in the diametral hole of a cylindrical screw head extending through the deflector and screwed on the outer face thereof into a nut clamping the said branch against the said internal face. At least one clamp provided with a screw blocking the rod on one tube of the frame slides on the intermediate transverse portion of the brace.

The attached drawing supplied as an example will clarify the invention, its features, and the advantages resulting therefrom.

FIGS. 4 and 5 show in perspective and, partly in plan view partly in section, respectively, the means fastening a screen to a motorcylce frame according to the invention.

FIG. 6 shows as in FIG. 1 means according to the invention, arranged for use on a motorcycle equipped with a steering damper.

Figure 1:
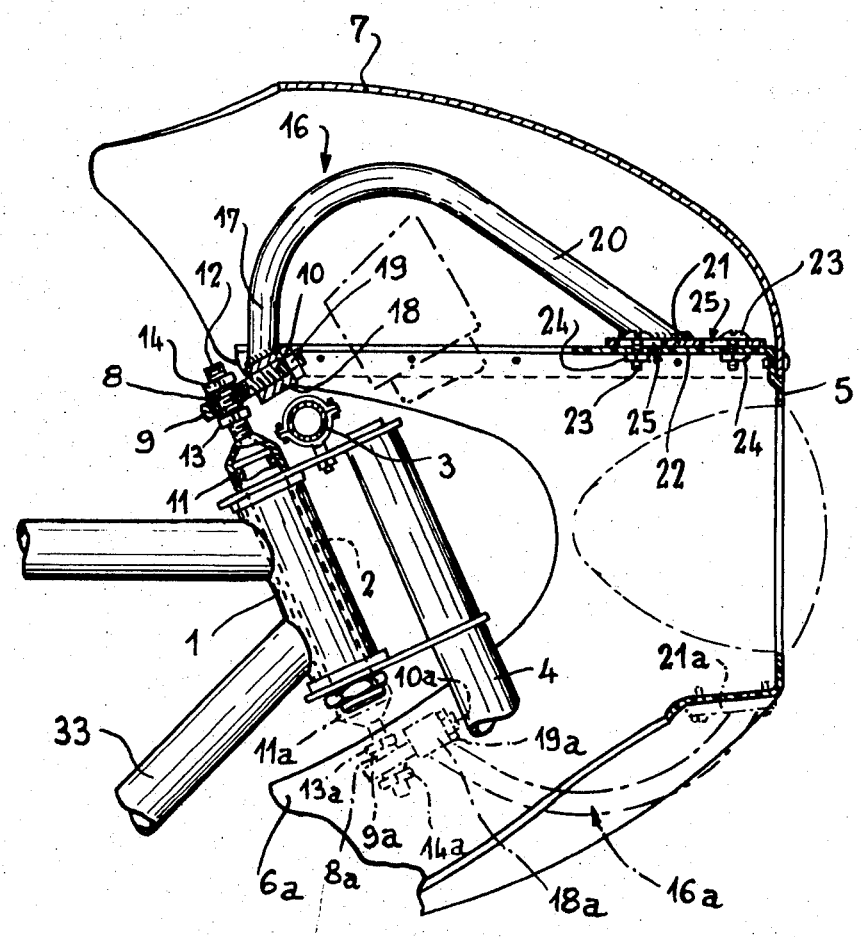
FIG. 1 is a diagram partly in elevation and partly in section of a portion of the front of the frame of a motorcycle equipped with a driver protection screen fixed to the said frame by means provided by the invention.

It will be remembered that the front part of a motorcycle frame comprises a sleeve 1 located in the frame plane of symmetry and acting as bearing for a generally tubular shaft 2 on which the handlebars 3 connected as a unit to the two arms 4 of the fork pivot on the said frame.

To mount on the motorcycle a screen 5 extended downward by substantially parallel lateral deflectors 6 and 6a (FIG. 5), and upward by a combined shield 7 of transparent plastic, the unit acting as a windbreaker for the driver, the said unit must be fixed to the frame while preserving for the handlebars and front fork the pivoting freedom necessary to steer.

Figure 2:
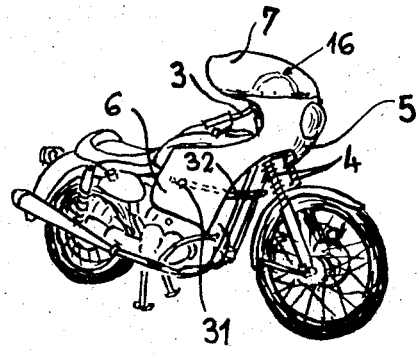
FIG. 2 is a diagrammatic perspective view of a motorcycle equipped with the unit represented in FIG. 1.

The general structure of the screen represented in FIG. 2 is adaptable without modification to many types of motorcycles, but to fasten it to the frame the mechanic must creat individually and from scratch fastening elements which are basically different for each type of motorcycle.

The fastening means of the invention consist substantially of standard elements and are designed to permit correct placement, position adjustment, and fastening of the screen to the frame regardless of the particular arrangement of the said frame and of the normal accessories mounted on the handlebars and front fork.

The means according to the invention comprise substantially a pivoted connection designed to be fixed to shaft 2 and to the screen to support the said screen, i.e., to carry the major part of its weight and maintain it oriented in the direction of shaft 2.

It will be observed that the pivot connection may be of the type having only one degree of freedom, i.e., permitting pivoting only in a plane perpendicular to shaft 2.

Advantageously, to simplify the assembly and permit adjustment of the screen inclination a pivot with two degrees of freedom is preferably used, i.e., a pivot of the swivel type whose pivot element forms a ring with a peripheral ball bearing. locked on shaft 2.

In known swivel joints manufactured in Switzerland by Fabrique de Machines Schaublin S.A. under the name of Unibal a ring 8 is retained in a peripheral bearing 9 provided with a threaded extension 10.

In a first embodiment (not represented) ring 8 is fixed coaxially on the upper end of tubular shaft 2 by a bolt or rod extending coaxially through shaft 2.

Figure 4:
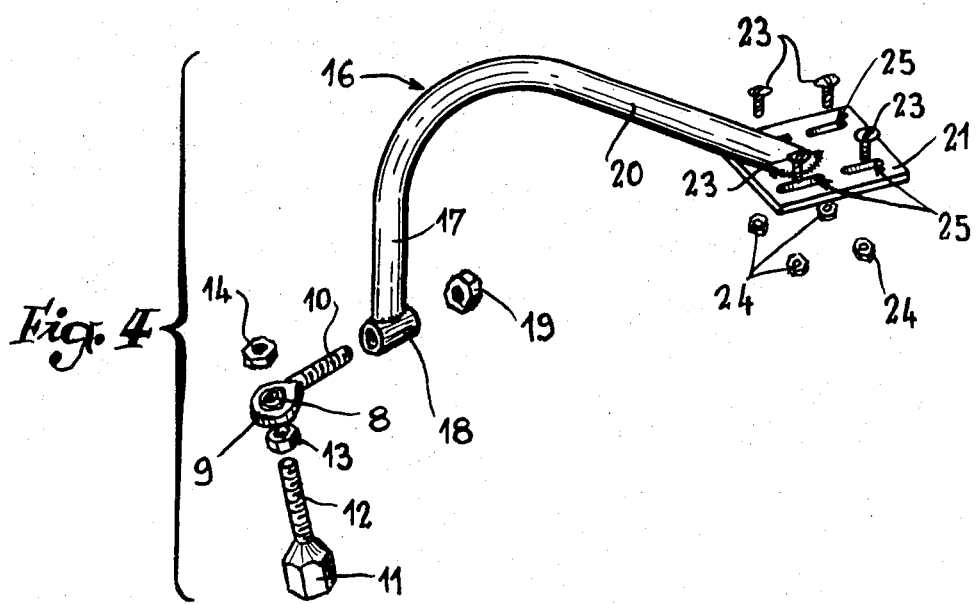

In another embodiment more particularly shown in FIG. 4 ring 8 is combined with a bolt 11 provided with a coaxial threaded shank 12 on which ring 8 is slipped and fixed at different levels by nuts 13 and 14.

Figure 3:
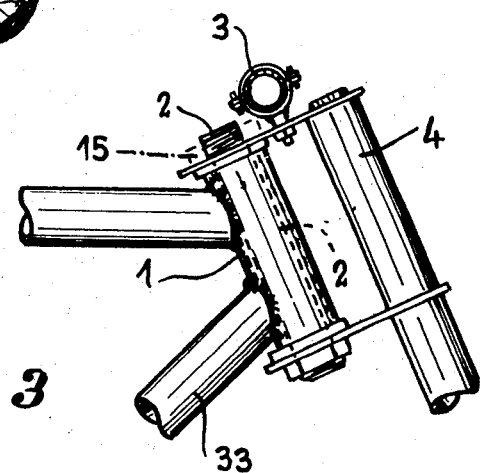
FIG. 3 represents a portion of the frame and front fork of a motorcycle ready to receive the screen with the fastening means of the invention.

The thread of bolt 11 is identical to that of a bolt 15 (FIG. 3) normally holding shaft 2 axially in frame sleeve 1, and after removal of bolt 15 it can be replaced by bolt 11 which, while providing for the same functions, also acts by means of shank 12 and ring 8 as pivot for bearing 9 and its threaded extension 10.

To connect the said extension to screen 5 use is made advantageously of a tube designated as a whole as 16, comprising a substantially vertical portion 17 whose lower end is provided with a threaded transverse ring 18 in which extension 10 can be screwed adjustably, and then locked in the desired position by a nut 19. On the side opposite vertical portion 17, to provide space for indicators, etc., tube 16 is first cruved above handlebars 3, and is continued obliquely downward and forward by a portion 20 whose end carries a plate or bracket 21 fixed to a transverse support plate 22 arranged near the top of screen 5, for example, by screws 23 and nuts 24 (FIG. 1).

As more specifically illustrated in FIG. 4 screws 23 extend through slots 25 parallel to the plane of symmetry of tube 16, 17, 20 in bracket 21. Since threaded extension 10 extends also in the plane of symmetry of tube 16, 17, 20 two means for the adjustment of the body unit are available to provide for forward and backward motion, and to a degree for upward and downward motion on the frame.

If necessary the screen can be fixed identically to the bottom end of shaft 2 by identical elements represented in FIG. 1 by dot and dash lines and designated by the same reference numerals followed by the index a.

The top and bottom means fastening the body on shaft 2 can be provided together or separately.

If the motorcycle is equipped with a steering damper shank 12 is suitably in the form of a tube designed to permit passage of the damper clamping bolt 26 and act as an end abutment for the damper clamping knob 26, as shown in FIG. 6.

It is understood that if the body is fixed to shaft 2 as explained above it can pivot independently of the fork 4 of handlebars 3 and of the frame in sleeve 1. The screen is therefore supported in its plane of symmetry, i.e., in the plane containing its center of gravity, but the fastening means must be completed by a brace fixing it to the frame and blocking it relative thereto in a position in which the planes of symmetry of the said screen and frame are and remain at least approximately in coincidence regardless of the angular position of the handlebars.

The said brace consists advantageously of a U-shped rod mounted as indicated in FIG. 5 transversely between the substantially parallel deflectors 6 and 6a of the screen, each of the two parallel branches 28 and 28a of the U extending along the internal face of one of the deflectors and sliding in the diametral hole 29 of a cylindrical screw head 30 extending through the deflector and screwed on the external face thereof into a nut 31.

It is understood that before unit 31 is tightened brace branch 28 can rotate with head 30 in the hole through which the said head extends through deflector 6, and can slide perpendicularly in hole 29, parallel to the deflector, to provide for the brace the most varied positions in relation to the transverse intermediate portion 32 of at least one tube 33 of the cradle formed by the frame, and to utilize a clamp 34 provided with a screw 35 slidable with the head 36 of a screw 35 on the said intermediate portion 32 to press it against tube 33 as shown in FIG. 5 in which the frame forms a double cradle to permit fastening the transverse portion of the two tubes 33 and 33a with suitable clamps 34, 34a.

The screen, fixed by tube 16, 17, 20 to shaft 2 pivoting with handlebars 3, and blocked in rotation relative to the cradle 34, 34a of the frame at a level distinctly lower than the tube by brace 28, 28a, 32, remains perfectly retained along the axis of symmetry of the frame while permitting pivoting of handlebars 3 and for 5 on the said frame as required to steer.

It is understood that the preceding description is supplied as an example, and does not restrict the scope of the invention which would not be exceeded by substitution of an equivalent for the described structural details.

I claim:

1. Fastening for a driver protection screen to the front of a motorcycle frame having a pivot shaft for handle bars, comprising: a pivot connection fixed to the screen and consisting of a pivot element fixed to move integrally with the handle bars and disposed coaxially to their pivot shaft to support and orient the screen axially in the plane of symmetry of the motorcycle frame, and at least one brace fastening the screen to the motorcycle frame and locking it transversely in relation thereto in such position that the planes of symmetry of the said screen and frame remain at least approximately in coincidence regardless of the angular position of the handle bars relative to the frame; the pivot connection consisting of a swivel whose pivot forms a ring provided with a spherical peripheral bearing which is blocked on the pivot shaft about which the handle bars pivot on the frame; and the pivot being completed by a coaxial bolt designed to replace on the threaded end of the pivot shaft of the handle bars the bolt which normally retains it axially in the sleeve of the frame acting as a bearer therefor.

2. The fastening as in claim 1, in which the pivot bolt consists of the assembly of two elements comprising a ring having a peripheral roller or ball bearing for th pivot, and a bolt provided with a threaded coaxial shank on which the said ring is engaged and blocked by at least one nut.

3. The fastening as in claim 2, in which the threaded shank is tubular to permit passage of the clamping bolt of a steering damper and acts as an end abutmenf for the knob of the said damper.

4. Fastening for a driver protection screen to the front of a motorcycle frame having a pivot shaft for handle bars, compprising: a pivot connection fixed to the screen an consisting of a pivot element fixed to move integrally with the handle bars and disposed coaxially to their pivot shaft to support and orient the screen axially in the plane of symmetry of the motorcycle frame, and at least one brace fastening the screen to the motorcycle frame and locking it transversely in relation thereto in such position that the planes of symmetry of the said screen and frame remain at least approximately in coincidence regardless of the angular position of the handle bars relative to the frame; the pivot connection being provided at the end of the substantially vertical portion of a tube which curves above the handle bars and is inclined downwardly and forwardly for connection by a bracket to a transverse support plate located near the top of the screen; the bearing of the connection pivot comprising a threaded extension, and the lower end of the vertical portion of the bent tube carrying a transverse ring threadly engaging and supporting said threaded extension in one of a number of selectible axial positions between which the extension can be moved forwardly or backwardly in the plane of symmetry of the said tube.

5. Improvements in fastening of a fairing at the front of a motorcycle frame having a steering axle for movement integrally with a handle bar utilizing a pivot bearing comprising two revolving parts which are fixed, one on said fairing and the other on a part moving integrally with said handle bar, in such a manner that the mutual pivot center will lie on the steering axle line, the fairing being futher prevented from turning about said bearing with respect to the frame by at least one brace fastening, wherein said improvements comprise, on said revolving part of the pivot bearing which is fixed on said part moving integrally with the handle bar, fastening means arranged for selfcentering of the pivot center by fixing said part on one of the two circular shaped ends of the steering axle.

6. Improvements as claimed in claim 5, useful on a motorcycle having a steering axle with at least one threaded end and in which said fastening means forms a nut adapted to be screwed onto said threaded end thereby replacing the usual adjusting nut generally provided thereon to retain it axially in the frame of the motorcycle.

7. Improvements as claimed in claim 5, in which said pivot bearing is a ball and socket bearing.

8. Improvements as claimed in claim 5, in which fastening means of the revolving part of the pivot bearing which is to be fixed on one of the two circular ends of the steering axle comprises a threaded coaxial shank for precise adjustment of said part coaxially along said steering axle.

9. Improvement as claimed in claim 5, in which fastening means of the revolving part of the pivot bearing which is to be fixed on the fairing comprises a threaded shank in substantially radial extension with respect to the steering axle for precise adjustment transverse to the latter.

10. Improvements in fastening of a fairing to the front of a motorcycle frame having a steering axle for moving integrally with a handle bar, utilizing a pivot bearing, the two revolving parts of which are to be fixed, one on said fairing and the other on a part moving with said handle bar in such a manner that the mutual pivot center will lie on the steering axle line, the fairing being further prevented from turning about said bearing with respect to the frame by a brace fastening; said improvements comprising the arrangement of said pivot bearing as a ball, and socket joint, and the arrangement of the brace as a U-shaped rod, whose two parallel branches extend along the internal face of parallel lateral deflectors of said fairing, each said branch sliding in grip-head mounted for free rotation on said corresponding lateral deflector, and the main intermediate portion of said brace sliding and rotating freely in at least one grip-clamp adapted to be also clamped around a substantially perpendicular bar integral with the motorcycle frame, said grip-heads and grip-clamps having further means to bolt them up firmly against sliding and rotation on the parts they connect together.

* * * * *